Patented Sept. 13, 1938

2,129,954

UNITED STATES PATENT OFFICE 2,129,954

METHOD OF MANUFACTURING COATED ABRASIVE ARTICLES

Harry Clifford Martin, Frederick Anthony Upper, and Joseph Bradley Aust, Niagara Falls, N. Y., assignors, by mesne assignments, to The Carborundum Company, Niagara Falls, N. Y., a corporation of Delaware No Drawing. Application December 28, 1935, Serial No. 56,530

2 Claims. (Cl. 51—278)

This invention relates to coated abrasive articles and methods of manufacturing the same. More particularly the invention is concerned with coated abrasives, such as abrasive disks, belts or sheets including a resinous binder, and especially such coated abrasives when formed on a backing which contains a plurality of layers.

Coated abrasives have commonly been made with a glue binder. Such articles have found a wide commercial use and are very excellent for certain purposes. However, modern developments have imposed more severe conditions on these articles and numerous demands have been made to produce coated abrasives which will be better adapted to the requirements of modern industry.

It has been proposed to manufacture coated abrasives with a binder consisting of a phenol formaldehyde condensation product, such as the well known "Bakelite", suitably flexibilized to permit the distortion which is required of coated abrasives. In order to apply the resinous coatings it has been suggested that the normally liquid condensation product obtained in the early stages of the condensation reaction be employed. It has also been suggested that the normally solid but fusible and soluble reaction products in the so-called "A" stage be dissolved in suitable solvents such as alcohol or acetone and that these solutions be employed as a source of the resinous bond for coated abrasive.

Both these methods of aplying resinous coatings have certain disadvantages which make them impractical from a commercial standpoint. The normally liquid condensation products are of a somewhat oily character and therefore tend to slip on the backing material when the coated abrasives are hung up to harden the liquid resin. Furthermore, these liquid resins are comparatively slow in curing and are reacted to such a small extent that it requires a very long heat treatment to advance them to the stage where they are sufficiently strong for the purpose intended.

The solutions of normally solid resins are likewise open to a number of objections from a practical standpoint. The volatile solvents which are employed are explosive when mixed with air and in some cases are toxic in character. Furthermore, these solvents are expensive and require the installation of elaborate equipment if the solvent is to be recovered. These normally solid resins are also comparatively highly reactive and present difficulties if the solutions are warmed to facilitate the process of applying them to the backing.

It has also been proposed to manufacture coated abrasives on a combination backing consisting of two or more layers of material, such as a layer of cloth attached to a heavy cardboard, or to a specially treated cellulosic product commonly referred to as "vulcanized fiber" or "hydrated cellulose". Such articles are used to a very considerable extent commercially by the automotive industry for sanding down the welds in automobile bodies, glue being used to "combine" the backing materials as well as to attach the abrasive grains to the combination backing. Since the heat-hardenable condensation products previously discussed require a rather prolonged curing at elevated temperatures, it is impossible to make such articles on backings which have been combined with glue because the glue which is used to combine the two backing materials releases water when the article is heated to cure the resin and causes a separation of the backing layers.

Both the normally liquid resin and the resin solution which have been proposed for attaching grains to the backing are unsuitable for combining the backing materials. The normally liquid products are not sticky enough to hold the backing layers satisfactorily until they have been cured, and the solutions are unsatisfactory because the volatile solvents employed cannot readily escape and it is practically impossible to prevent the formation of bubbles when the articles are cured. These bubbles cause a separation of the backing layers in spots and provide a starting point for the complete separation of the two layers when the articles are used.

It is, accordingly, an object of the present invention to provide a method for attaching abrasive grains to a backing material which is commercially practical and which will overcome the difficulties discussed above. It is also an object of the invention to provide a method and a material suitable for combining the layers of combination backings. Other objects of the invention will appear from a consideration of the following discussion.

We have discovered that excellent coated abrasives may be made by employing a solution of a normally solid resin, such as a heat-hardenable condensation product, in a normally liquid resin, that is, the initial condensation product which has been advanced to the stage where it is liquid at ordinary temperatures. We have also found that such solutions provide a very satisfactory material for combining the various layers of a combination backing, such as cloth and hydrated cellulose.

In carrying out our invention we have found it convenient to first prepare a solution of rather high viscosity which has sufficient body and tackiness at ordinary temperatures to retain the abrasive grains in position when the coated articles are suspended vertically, and which likewise has the property of holding the layers of the combination backing firmly in position until the resins are cured.

In order to facilitate the application of these viscous solutions we usually find it convenient to warm them up, and thereby reduce the viscosity, using temperatures which are sufficient for the purpose but which are not high enough to cause substantial reaction of the resinous liquid during the time required to apply it to the backing.

The proportions of solid and liquid materials which are used in preparing the solution will depend upon the initial viscosity of the liquid material, the size of the abrasive grits which are to be attached, and the temperature to which the solution is to be heated when it is applied. A distinction is also made between the viscosity used in the adhesive employed for combining the backing layers and for that one used to attach the abrasive grains initially to the backing. It is also desirable to use a liquid of different viscosity for the second or sizing coating which is applied to the abrasive backing after the coated grains have been initially attached.

The invention may be carried out by use of conventional apparatus, specific methods for making such a coated article being described in the following examples. It is to be understood that these examples are for illustrative purposes only and are not limitative.

Example I

A web of cloth of a type commonly employed in the manufacture of coated abrasives and known in the trade as "two eighty-five drill" (2.85 yards, 30 inches wide, weighs one pound) was first given a sizing coating of a liquid phenol aldehyde resin having a viscosity of approximately 500 centipoises by passing the cloth between the rolls of a conventional sandpaper making machine wherein the cloth was passed between a rotating pressure roll and a rotating adhesive roll which was partially submerged in a bath of the liquid resin.

The sized cloth was then run between a similar pair of rolls where a backing binder was applied to a surface of the cloth. This backing binder was prepared by dissolving 50 pounds of a normally solid phenol formaldehyde condensation product in the "A" stage in 30 gallons of the liquid resin which was used for a preliminary cloth sizing. The binding adhesive was heated to 130° F. to obtain a suitable viscosity.

The sized and adhesive coated cloth was then passed through a pair of pressure rolls along with a web of hydrated cellulose of a character commonly employed in making abrasive coated disks, whereby the two layers of backing were subjected to pressure and caused to form a unitary structure. After passing through the pressure rolls the combination backing was wound up into a roll suitable for use in the conventional sandpaper making machine.

This web of combination backing was then fed into an abrasive paper coating machine where a layer of resinous adhesive was applied to the cloth side of the backing. This adhesive was prepared by dissolving 10 pounds of a normally solid resin, as described above, in 5 gallons of a normally liquid resin of the character described above. It was heated to about 130° F. while it was being applied to the backing.

36 grit fused alumina abrasive grain was then distributed over the adhesive coated side of the backing by feeding it over the adhesive coated web from a bin provided with a feed roll as commonly used in manufacturing sandpaper.

The abrasive coated backing was then hung up in festoons in the conventional manner to permit the grain binder to return to normal temperatures and thus set up to a point where the grains were firmly attached and was then passed through a pair of sizing rolls where a sizing coating of the liquid resin alone was applied over the abrasive grains.

The web was then given a heat treatment in a chamber, the temperature of which was raised from 100° F. to 160° F. in nine hours and was held at 160° F. for three hours. The coated web was then rolled loosely with the abrasive coated side out and baked at 200° F. for four hours and at 250° F. for eight hours. Abrasive disks were then cut from the web.

Example II

A web of paper of a character commonly employed in the manufacture of coated abrasives and known as 130 pound cylinder paper was coated with a resinous binder and abrasive grains, as described in Example I. The making coat of binder was prepared by dissolving 5 pounds of a phenol-reacted oil-modified alkyd resin in an oil-modified alkyd resin in liquid condition. The phenol-reacted oil-modified resin was a product obtained by simultaneously reacting glycerol, phthalic anhydride, a small proportion of the fatty acids derived from linseed oil, a phenol and formaldehyde. The oil-modified alkyd resin was the initial condensation product obtained by reacting glycerol, phthalic anhydride and the fatty acids from linseed oil. 80 grit fused alumina was employed as the abrasive and after heat treatment, as described above, a coated web of sandpaper suitable for use in wood-working industries was obtained.

As intimated above, our invention has a number of advantages.

As to the feature of combining materials to form combination backings the invention provides a method for attaching the backing layers so that the web of combination backing can be rolled up and put into suitable form for passage through a sandpaper making machine. This feature results from the fact that the combining adhesive used is sufficiently tacky and correspondingly has sufficient strength at ordinary temperatures before it has been cured so that the layers adhere together firmly. At the same time, the binder and the backing are both sufficiently flexible so that the backing can be fed through the paper making machine where it is required to pass around pulleys and idler rolls and in general be subjected to considerable distortion. This flexibility, which is necessary at this stage of the process, is reduced however when the coated article is heated to set up the resinous combining adhesive and the finished article has the stiffness which is required of it. The degree of flexibility or stiffness of the completed article may be varied by the selection of suitable resins or by incorporating plasticizing agents as required.

As to the use of solutions of solid resins in liquid resins for attaching abrasive grains to a backing, such solutions have numerous advantages over the normally liquid resins or the solutions of solid resins dissolved in solvents as heretofore used. As was previously pointed out, the liquid resins are comparatively slow curing and they do not have the tackiness which is required to hold the abrasive grains while the adhesive is still liquid. Our invention has a further advantage that it is possible to produce solutions of different degrees of viscosity by admixing various proportions of solid and liquid resins. It is also possible to modify the characteristics of the bond in the cured article by employing solid resins of one type and liquid resins of a different type. Our invention also provides a method for compensating for the increase in viscosity which results from the warming of the solution, since it is only necessary to add additional liquid resin if the solution thickens up. Furthermore, as is indicated from the examples, the fact that it is possible to warm the adhesives prior to applying them to a backing and thus reduce their viscosity to a point where they can be applied in suitable thickness and then cause them to thicken by merely allowing them to return to ordinary atmospheric temperatures is of material value from a practical operating standpoint.

Our invention is adapted to numerous modifications, as is indicated by the examples. For instance, the examples employ heat hardening resins in both the liquid and the solid condition but it is within the scope of our invention to use non-hardening solid resins in the heat-hardenable liquids as well as solid resins which are themselves heat-hardenable. Furthermore, the characteristics of the binder may be modified by the addition of suitable agents such as tricresyl phosphate, dibutyl phthalate, or other commonly known plasticizers. Other modifications known to those versed in the art may be used, all as defined in the appended claims.

We claim:

1. The method of making abrasive coated articles consisting essentially of a backing material having a layer of abrasive grains attached to a surface thereof by a heat-hardened resinous binder which comprises dissolving a fusible normally solid phenol-aldehyde condensation product in a normally liquid heat-hardenable phenol-aldehyde condensation product to form a viscous sticky heat-hardenable resinous liquid which adheres to the backing when the coated articles are suspended while hardening the liquid, applying a layer of the liquid to a surface of a backing material, applying a layer of abrasive grains to the adhesive-coated surface, and heating the thus-formed article to rigidify the liquid.

2. The method of making flexible but relatively stiff abrasive coated articles comprising a backing material containing a plurality of layers united and stiffened by the inclusion of a heat-hardened resin which comprises coating a layer of the backing with a heat-hardenable liquid which is sticky and tacky at ordinary temperatures and hardenable by heat without causing separation of the layers of the backing and which consists essentially of a normally-liquid and a fusible normally-solid phenol-aldehyde condensation product, applying a second backing layer to the liquid-coated first layer and combing the two layers to form a flexible unitary structure, coating the combination backing with a resinous adhesive which is heat-hardenable under the conditions required to heat-harden the combining liquid, and which consists essentially of a normally-liquid and a fusible normally-solid phenol aldehyde condensation product, applying a layer of abrasive grains to the adhesive coated surface, and heating the thus-formed article to rigidify the resinous liquids whereby the abrasive grains are firmly attached to the stiffened backing and the layers of backing are firmly united.

HARRY CLIFFORD MARTIN.
FREDERICK ANTHONY UPPER.
JOSEPH BRADLEY AUST.